United States Patent
Levi

(10) Patent No.: US 9,928,430 B2
(45) Date of Patent: Mar. 27, 2018

(54) DYNAMIC STIXEL ESTIMATION USING A SINGLE MOVING CAMERA

(71) Applicant: GM GLOBAL TECHNOLOGY OPERATIONS LLC, Detroit, MI (US)

(72) Inventor: Dan Levi, Kyriat Ono (IL)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 87 days.

(21) Appl. No.: 15/085,082

(22) Filed: Mar. 30, 2016

(65) Prior Publication Data

US 2016/0300114 A1  Oct. 13, 2016

Related U.S. Application Data

(60) Provisional application No. 62/145,949, filed on Apr. 10, 2015.

(51) Int. Cl.

| G06K 9/00 | (2006.01) |
|---|---|
| G06K 9/52 | (2006.01) |
| G06T 7/00 | (2017.01) |
| G06T 7/20 | (2017.01) |
| G06T 7/50 | (2017.01) |
| G06T 7/246 | (2017.01) |

(52) U.S. Cl.
CPC .......... G06K 9/00805 (2013.01); G06T 7/246 (2017.01); G06T 7/50 (2017.01); *G06T 2207/30252* (2013.01)

(58) Field of Classification Search
CPC ............ G06K 9/00805; G06K 9/00791; G06T 7/246; G06T 7/50; G06T 2207/30252; G06T 2207/30261
See application file for complete search history.

(56) References Cited

U.S. PATENT DOCUMENTS

| 2011/0311108 A1* | 12/2011 | Badino | G06K 9/00805 382/106 |
|---|---|---|---|
| 2014/0205184 A1* | 7/2014 | Franke | G06K 9/00201 382/154 |
| 2015/0206015 A1* | 7/2015 | Ramalingam | G06K 9/00791 382/104 |

OTHER PUBLICATIONS

Muffert et al. "A Stereo-Vision Based Object Tracking Approach at Roundabouts." IEEE Intelligent Transportation Systems Magazine, vol. 5, issue 2, Apr. 23, 2013, pp. 22-32.*
Pfeiffer et al. "Modeling Dynamic 3D Environments by Means of the Stixel World." IEEE Intelligent Transportation Systems Magazine, Aug. 19, 2011, pp. 24-36.*
Pfeiffer et al. "Efficient Representation of Traffic Scenes by Means of Dynamic Stixels." IEEE Intelligent Vehicles Symposium, Jun. 21, 2010, pp. 217-224.*

* cited by examiner

*Primary Examiner* — Jon Chang
(74) *Attorney, Agent, or Firm* — Lorenz & Kopf, LLP

(57) ABSTRACT

Methods and system for detecting an object are provided. In one embodiment, a method includes: receiving, by a processor, image data from a single camera, the image data representing an image of scene; determining, by the processor, stixel data from the image data; detecting, by the processor, an object based on the stixel data; and selectively generating, by the processor, an alert signal based on the detected object.

16 Claims, 4 Drawing Sheets

DYNAMIC STIXEL ESTIMATION USING A SINGLE MOVING CAMERA

CROSS REFERENCE TO RELATED APPLICATIONS

This application claims the benefit of U.S. Provisional Application No. 62/145,949 filed Apr. 10, 2015 which is incorporated herein in its entirety.

TECHNICAL FIELD

The technical field generally relates to object detection systems and methods of a vehicle, and more particularly relates to object detection systems that detect objects based on a dynamic stixel estimation

BACKGROUND

Vehicles include systems that detect objects in proximity to the vehicle. The systems typically use the information about the object to alert the driver to the object and/or to control the vehicle. The systems detect the object based on sensors placed about the vehicle. For example, multiple cameras are placed in the rear, the side, and/or the front of the vehicle in order to detect objects. Images from the multiple cameras are used to detect the object based on stereo vision. Having multiple cameras increases an overall cost of the vehicle.

Accordingly, it is desirable to provide methods and systems that detect objects based on a single camera. Furthermore, other desirable features and characteristics of the present invention will become apparent from the subsequent detailed description and the appended claims, taken in conjunction with the accompanying drawings and the foregoing technical field and background.

SUMMARY

Methods and system for detecting an object are provided. In one embodiment, a method includes: receiving, by a processor, image data from a single camera, the image data representing an image of scene; determining, by the processor, stixel data from the image data; detecting, by the processor, an object based on the stixel data; and selectively generating, by the processor, an alert signal based on the detected object.

In one embodiment, a system includes a non-transitory computer readable medium. The non-transitory computer readable medium includes a first computer module that receives, by a processor, image data from a single camera, the image data representing an image of scene, and that determines stixel data from the image data. The non-transitory computer readable medium further includes a second computer module that determines, by the processor, stixel data from the image data, that detects, by the processor, an object based on the stixel data, and that selectively generates, by the processor, an alert signal based on the detected object.

DESCRIPTION OF THE DRAWINGS

The exemplary embodiments will hereinafter be described in conjunction with the following drawing figures, wherein like numerals denote like elements, and wherein.

DETAILED DESCRIPTION

Figure 1:
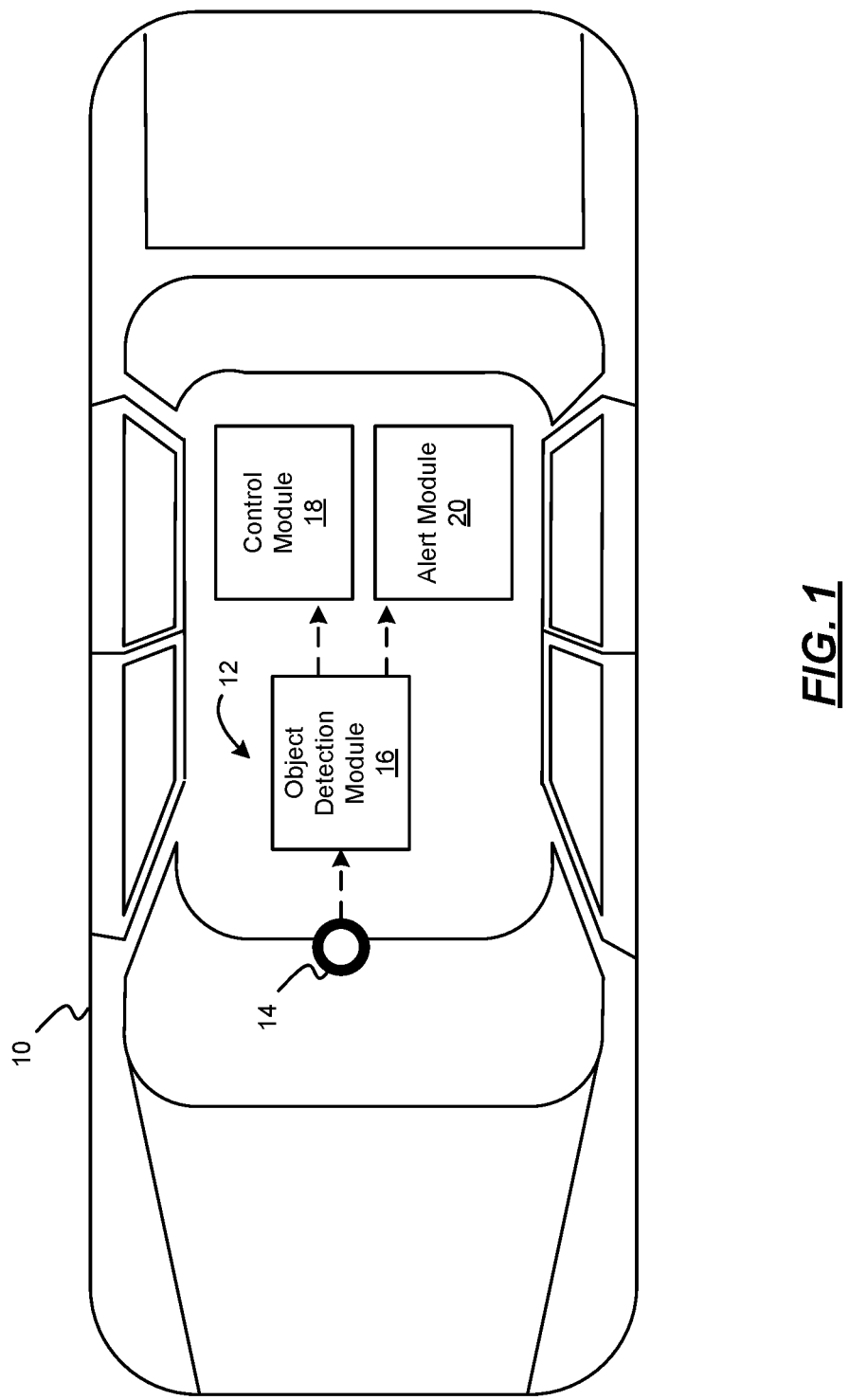
FIG. 1 is illustration of a vehicle that includes an object detection system in accordance with various embodiments.

The following detailed description is merely exemplary in nature and is not intended to limit the application and uses. Furthermore, there is no intention to be bound by any expressed or implied theory presented in the preceding technical field, background, brief summary or the following detailed description. It should be understood that throughout the drawings, corresponding reference numerals indicate like or corresponding parts and features. As used herein, the term module refers to an application specific integrated circuit (ASIC), an electronic circuit, a processor (shared, dedicated, or group) and memory that executes one or more software or firmware programs, a combinational logic circuit, and/or other suitable components that provide the described functionality.

Referring now to FIG. 1, a vehicle 10 is shown to include an object detection system 12 in accordance with various embodiments. Although the figures shown herein depict an example with certain arrangements of elements, additional intervening elements, devices, features, or components may be present in an actual embodiments. It should also be understood that FIG. 1 is merely illustrative and may not be drawn to scale.

The object detection system 12 includes a single sensor 14 that is associated with an object detection module 16. The single sensor 14 senses observable conditions in proximity to the vehicle 10. The sensor 14 can be an image sensor that senses observable conditions in proximity to the vehicle 10. For exemplary purposes, the disclosure is discussed in the context of the sensor 14 being a camera that generates visual images of a scene outside of the vehicle 10.

The sensor 14 can be located anywhere inside our outside of the vehicle 10, including but not limited to a front side of the vehicle 10, a left side of the vehicle 10, a right side of the vehicle 10, and a back side of the vehicle 10. As can be appreciated, multiple single sensors 14 can be implemented on the vehicle 10, one for each of or a combination of the front side of the vehicle 10, the left side of the vehicle 10, the right side of the vehicle 10, and the back side of the vehicle 10. For exemplary purposes, the disclosure will be discussed in the context of the vehicle 10 having only one single sensor 14.

The single sensor 14 senses an area associated with the vehicle 10 and generates sensor signals based thereon. The sensor signals include image data. The object detection module 16 receives the signals, processes the signals in order to detect an object, and selectively generates signals based on the detection of the object. The signals are received by a control module 18 and/or an alert module 20 to selectively control the vehicle 10 and/or alert the driver to control the vehicle 10 to avoid the object. In various embodiments, the object detection module 16 detects the object based on a dynamic stixel estimation method that uses the image data from the signals.

Figure 2:
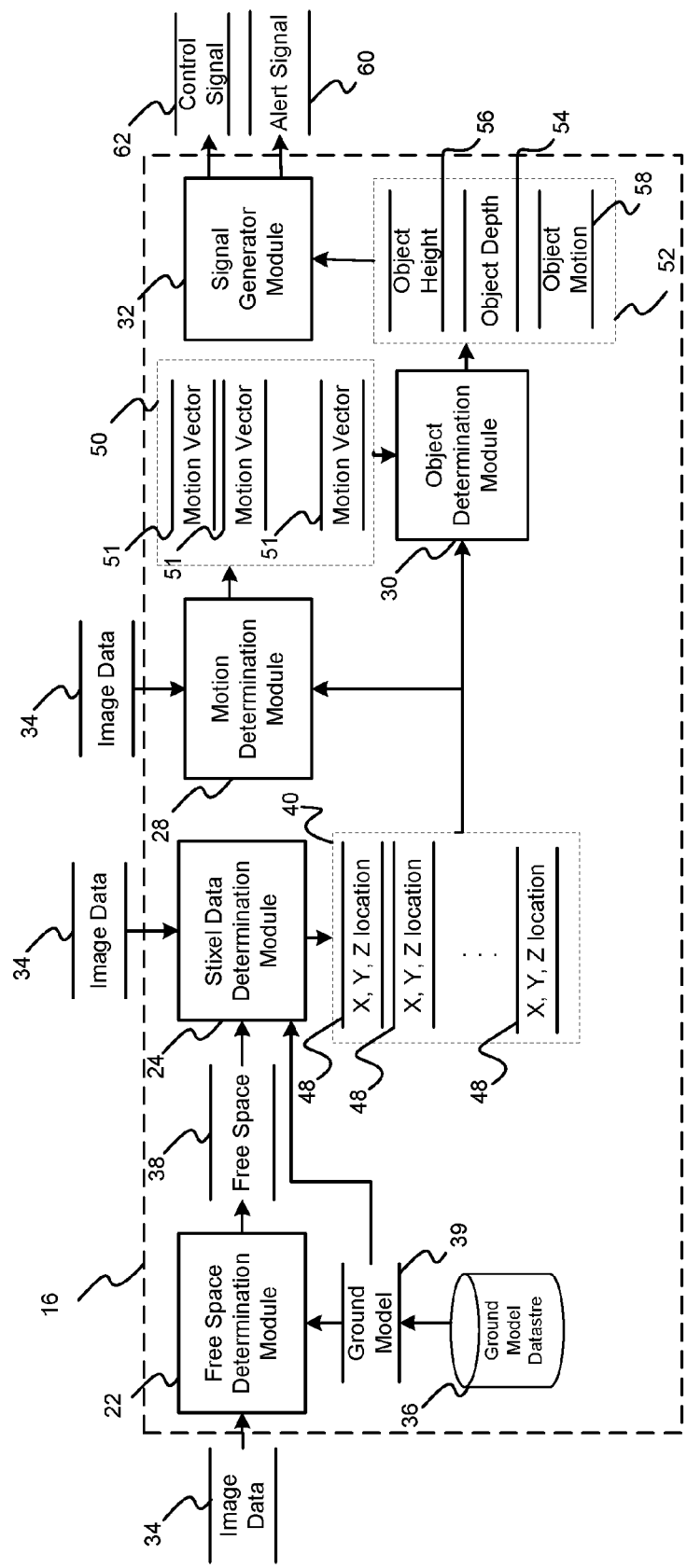
FIG. 2 is a dataflow diagram illustrating an object detection module of the object detection system in accordance with various embodiments.
Figure 3:
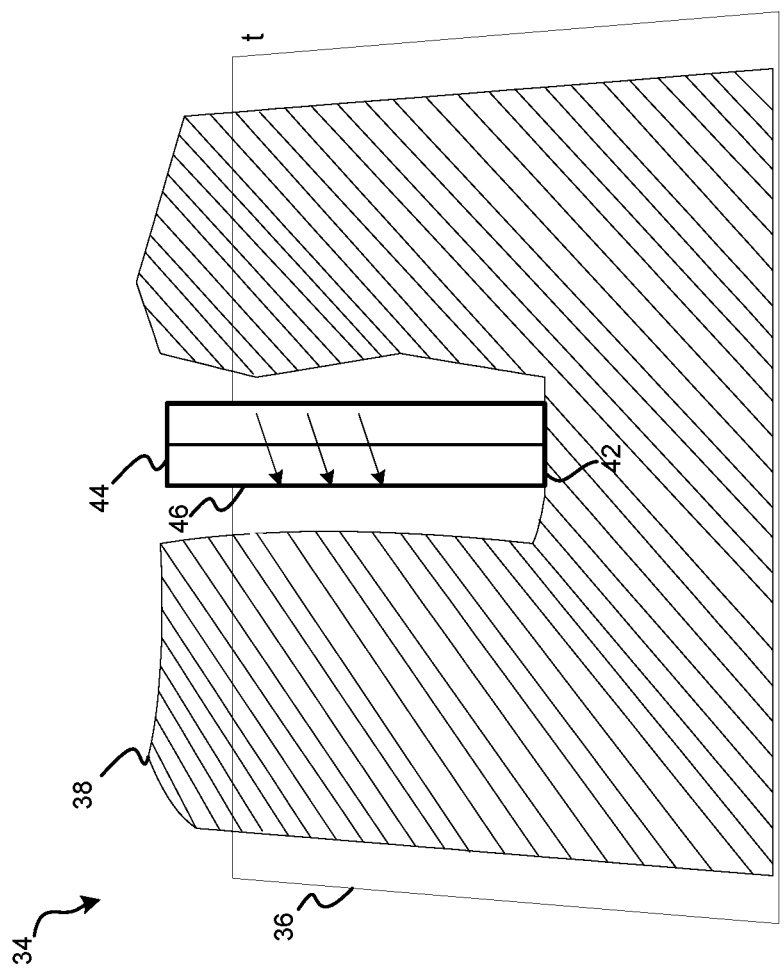
FIG. 3 is an illustration of image data in accordance with various embodiments.

Referring now to FIGS. 2 and 3, in FIG. 2 a dataflow diagram illustrates various embodiments of the object detection module 16 of the object detection system 12 (FIG. 1).

The object detection module 16 processes image data as shown in FIG. 3 in accordance with various embodiments. As can be appreciated, various embodiments of the object detection module 16 according to the present disclosure may include any number of sub-modules. As can further be appreciated, the sub-modules shown in FIG. 2 may be combined and/or further partitioned to similarly detect an object and to generate signals based on the detection. Inputs to the object detection module 16 may be received from the single sensor 14 of the vehicle 10 (FIG. 1), received from other control modules (not shown) of the vehicle 10 (FIG. 1), and/or determined by other sub-modules (not shown) of the object detection module 16. In various embodiments, the object detection module 16 includes a free space determination module 22, a stixel data determination module 24, a ground model datastore 26, a motion determination module 28, an object determination module 30, and a signal generator module 32.

The free space determination module 22 receives as input the image data 34 from the signals generated by the single sensor 14 (FIG. 1). The image data 34 includes data for an image frame at time t and an image frame at time t+1. As can be appreciated, in various embodiments, additional image frames can be included in the image data 34 as the disclosure is not limited to two image frames. For exemplary purposes the disclosure will be discussed in the context of image data 34 including two image frames.

Based on the image data 34, the free space determination module 22 determines a free space 38. For example, as shown in FIG. 3, the free space 38 is the space in the image that is above the ground 36 and that does not include an object.

In various embodiments, the free space determination module 22 determines the free space 38 based on a ground model 39 and an optical flow of the image. The ground model 39 is a model of the ground 36 (FIG. 2) that is defined from the perspective of the single sensor 14 (FIG. 1) and assumes the ground 36 to be flat. The free space determination module 22 computes the optical flow of the image based on the image data 34 according to known optical flow determination methods.

In various embodiments, the free space determination module 22 uses the optical flow of the image to estimate a homography of a ground plane that is defined by the ground model 39. The free space determination module 22 compares the homography of ground plane with a homography of the remaining image. The free space determination module 22 then determines the free space 38 based on the space in the remaining image that has a same or similar homography as the ground plane. As can be appreciated, other methods of determining the free space 38 can be used in various embodiments as the disclosure is not limited to the present examples.

The stixel data determination module 24 receives as input the image data 34, and the free space 38. The stixel data determination module 24 determines stixel data 40 for each frame (frame t and frame t+1) based on the image data 34, and the free space 38. For example, as shown in FIG. 3, for frame t, the stixel data determination module 24 determines a bottom 42 and a top 44 of a stixel 46. The stixel data determination module 24 determines the bottom 42 based on a point (or pixel) where the free space 38 ends. The free space 38 ends, for example, where the free space 38 meets the ground plane as defined by the ground model 39. The stixel data determination module 24 then determines an initial depth (Zi) at the bottom 42. For example, the stixel data determination module 42 determines the initial depth (Zi) based on a known sensor position (e.g., height of the single sensor 14 (FIG. 1)), a sensor motion, and the location of the bottom 42 in the image.

The stixel data determination module 24 then evaluates the points (or pixels) in the column above the bottom 42 to determine the top 44 of the stixel 46. In various embodiments, the stixel data determination module 24 determines the top 44 based on a change or ending in a consistency of a value associated with the points (or pixels) in the column. For example, a depth value (Z) of each point (or pixel) can be determined and evaluated in order to determine the top 44. Assuming that the object is stationary, the stixel data determination module 24 uses the optical flow (computed from the image data 34) for each point (or pixel) in the column above the bottom 42, the determined initial depth (Zi), and the motion of the vehicle 10 (FIG. 1) to determine the depth (Z) for each point (or pixel). Once the depth (Z) for each point (or pixel) is estimated, the stixel data determination module 24 determines the top 44 of the stixel by grouping all the points (or pixels) with a similar depth, and setting the top 44 to the last point (or pixel) in the group.

The stixel data determination module 24 then determines the location 48 (X, Y coordinates) of each point (or pixel) between the bottom 42 and the top 44 based on a known sensor position (e.g., height of the single sensor 14 (FIG. 1)), a sensor motion, and the location of the point (or pixel) in the image. The stixel data determination module then stores the X, Y, Z location 48 for each point (or pixel) between the bottom 42 and the top 44 as the stixel data 40.

The motion determination module 28 receives as input the stixel data 40 for each frame (frame t and frame t+1), and the image data 34. Based on the stixel data 40 and the image data 34, the motion determination module 28 determines a motion data 50 associated with the stixel 46. For example, the motion determination module 28 determines a motion vector 51 for each point (or pixel) in the stixel data 40. In various embodiments, the motion determination module 28 determines a disparity vector per pixel (in image coordinates) between corresponding points in frame t and frame t+1 from the computed optical flow, and subtracts the disparity from the expected disparity of a stationary pixel in the given X, Y, Z location. The resulting residual disparity vectors per pixel are attributed to the motion of the pixel in the world. Given the residual disparity vector, the motion of the pixel in the world is computed, and by averaging over all pixels in the stixel the motion of the stixel in the world is computed. For example, if in frame t the X, Y, Z position for the point (or pixel) is P_t=[Xt, Yt, Zt] and the computed optical flow positions the point (or pixel) in frame t+1 in a point or pixel with estimated position P_t+1=[Xt+1, Yt+1, Zt+1] then the motion vector 51 of the point (or pixel) is set to P_t+1−P_t. As can be appreciated, the above computation assumes the height of the point has not changed (Yt=Yt+1). As can be appreciated, other methods of determining the motion data 50 can be used in various embodiments as the disclosure is not limited to the present examples.

The object determination module 30 receives as input the stixel data 40 and the motion data 50 for multiple stixels 46 (e.g., two or more consecutive stixels) in the image. Based on the inputs, the object determination module 30 determines object data 52. The object data 52 includes an overall depth 54, an overall height 56, and an overall motion 58 of an object in the image. In various embodiments, the object determination module 30 determines the overall depth 54 based on an average of the depths in the stixels. In various embodiments, the object determination module 30 determines the overall height 56 based on a highest height (Y coordinate) having the overall depth 54 in the stixels. In various embodiments, the object determination module 30 determines the overall motion 58 based on an average of the motion vectors in the stixels. In various embodiments, each of the depth 54, the height 56, and the motion 58 may be further filtered, for example, based on values determined from other frames.

The signal generator module 32 receives as input the object data 52. The signal generator module 32 evaluates the height 56, the depth 54, and the motion 58 and selectively generates an alert signal 60 and/or a control signal 62 based on the evaluation. For example, if an evaluation of the height 56, the depth 54, or the motion 58 indicates that the object poses a threat, then an alert signal 60 and/or a control signal 62 is generated.

Figure 4:
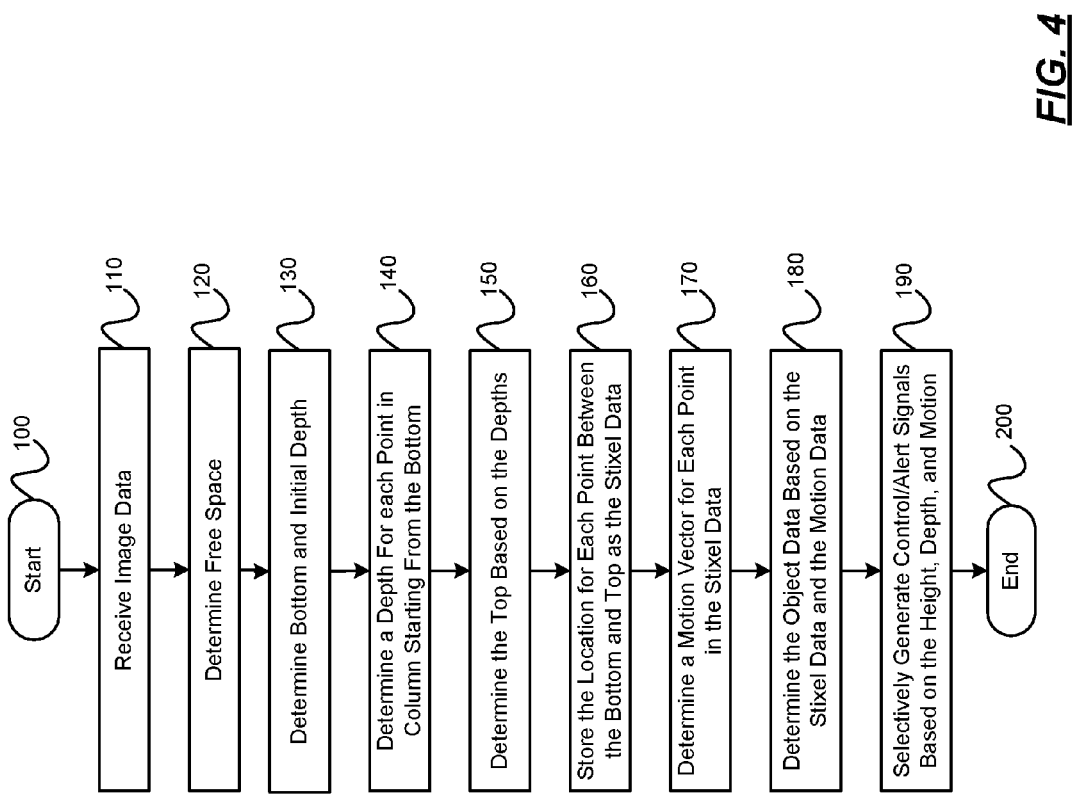
FIG. 4 is a flowchart illustrating an object detection method that may be performed by the object detection system in accordance with various embodiments.

Referring now to FIG. 4, and with continued reference to FIGS. 1, 2 and 3, a flowchart illustrates an object detection method that can be performed by the object detection system of FIGS. 1 and 2 in accordance with various embodiments. As can be appreciated in light of the disclosure, the order of operation within the method is not limited to the sequential execution as illustrated in FIG. 4, but may be performed in one or more varying orders as applicable and in accordance with the present disclosure.

As can further be appreciated, the method of FIG. 4 may be scheduled to run at predetermined time intervals during operation of the vehicle 10 and/or may be scheduled to run based on predetermined events.

In one example, the method may begin at 100. The image data 34 is received at 110. From the image data 34, the free space 38 is determined at 120. From the free space 38 and the ground model 39, the bottom 42 and the initial depth (Zi) are determined at 130. The depths for each point (or pixel) in the column above the bottom 42 are determined based on the initial depth (Zi) at 140. The top 44 is determined based on an evaluation of the depths of each point (or pixel) in the column at 150, for example as discussed above. The X, Y, Z position of each point (or pixels) between the bottom 42 and the top 44 is determined and stored at 160. The motion data 50 comprising the motion vector 51 for each point (or pixel) in the stixel 46 is determined from the image data 34 and the stixel data 40 at 170, for example as discussed above. The object data 52 is then determined based on the stixel data 40 and the motion data 50. In various embodiments, the object data 52 is filtered, for example, based on values determined from other frames at 180. The object data 52 is then used to selectively generate the controls signals 62 and/or alert signals 60 at 190. Thereafter, the method may end at 200.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method of detecting an object, comprising:
receiving, by a processor, image data from a single image sensor, the image data including at least two frames representing an image of scene;
determining, by the processor, a ground model and an optical flow from the image data;
determining, by the processor, free space from the ground model and the optical flow;
determining, by the processor, stixel data from the free space;
detecting, by the processor, an object based on the stixel data; and
selectively generating, by the processor, an alert signal based on the detected object.

2. The method of claim 1, wherein the stixel data comprises an X,Y,Z coordinate of each pixel between a determined top location and a determined bottom location.

3. The method of claim 2, further comprising determining the bottom location based on the determined free space and the ground model.

4. The method of claim 2, further comprising determining the top position based on a change in a value associated with the points above the determined bottom location.

5. The method of claim 4, wherein the value is a determined depth of each point.

6. The method of claim 1, further comprising determining motion data based on the stixel data and the image data, and wherein the detecting the object is based on the motion data.

7. The method of claim 6, wherein the determining the motion data comprises determining a disparity vector per point in the stixel data based on an optical flow.

8. The method of claim 7, wherein the determining the motion data further comprises subtracting the disparity vector from an expected disparity vector to obtain the motion data.

9. A system for detecting an object, comprising:
a non-transitory computer readable medium comprising:
a first computer module that receives, by a processor, image data from a single image sensor, the image data including at least two frames representing an image of a scene, that determines a ground model and an optical flow from the image data, and that determines free space from the ground model and the optical flow; and
a second computer module that determines, by the processor, stixel data from the free space, that detects, by the processor, an object based on the stixel data, and that selectively generates, by the processor, an alert signal based on the detected object.

10. The system of claim 9, wherein the stixel data comprises an X,Y,Z coordinate of each pixel between a determined top location and a determined bottom location.

11. The system of claim 10, further comprising a third computer module that determines the bottom location based on the determined free space and the ground model.

12. The system of claim 10, further comprising a third computer module that determines the top position based on a change in a value associated with the points above the determined bottom location.

13. The system of claim 12, wherein the value is a determined depth of each point.

14. The system of claim 9, further comprising a fourth computer module that determines motion data based on the stixel data and the image data, and wherein the second computer module detects the object based on the motion data.

15. The system of claim 14, wherein the fourth computer module determines the motion data by determining a disparity vector per point in the stixel data based on an optical flow.

16. The system of claim 15, wherein the fourth computer module determines the motion data further by subtracting the disparity vector from an expected disparity vector to obtain the motion data.

\* \* \* \* \*